(12) United States Patent
Blinick et al.

(10) Patent No.: US 7,624,203 B2
(45) Date of Patent: Nov. 24, 2009

(54) MULTIPLEXING A GROUND SIGNAL ON A HIGH SPEED CABLE INTERFACE TO PROVIDE ACCESS TO CABLE VITAL PRODUCT DATA

(75) Inventors: Katherine T Blinick, Tucson, AZ (US); Yutaka Kawai, Tokyo (JP); Gregg S Lucas, Tucson, AZ (US); Robert E Medlin, Tucson, AZ (US); Kenneth R Schneebeli, San Jose, CA (US); Michael Stamps, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 11/381,680

(22) Filed: May 4, 2006

(65) Prior Publication Data
US 2007/0260788 A1 Nov. 8, 2007

(51) Int. Cl.
*G06F 3/00* (2006.01)
(52) U.S. Cl. .................................. 710/16; 398/192
(58) Field of Classification Search .................. 710/8, 710/316, 104
See application file for complete search history.

(56) References Cited

U.S. PATENT DOCUMENTS

| | | | |
|---|---|---|---|
| 4,311,986 A * | 1/1982 | Yee | 340/825.63 |
| 5,436,593 A * | 7/1995 | Fiori, Jr. | 330/69 |
| 5,664,952 A | 9/1997 | Mockett et al. | |
| 5,745,795 A | 4/1998 | Pecone et al. | |
| 5,768,627 A | 6/1998 | Jones et al. | |
| 5,995,633 A | 11/1999 | Cappels et al. | |
| 6,237,048 B1 * | 5/2001 | Allen et al. | 710/8 |
| 6,313,868 B1 * | 11/2001 | D'Alfonso et al. | 348/72 |
| 6,576,833 B2 * | 6/2003 | Covaro et al. | 174/359 |
| 6,587,062 B1 | 7/2003 | Reinhold et al. | |
| 2004/0025089 A1 * | 2/2004 | Haswarey et al. | 714/42 |
| 2006/0025018 A1 * | 2/2006 | Dube et al. | 439/628 |

* cited by examiner

*Primary Examiner*—Henry W. H. Tsai
*Assistant Examiner*—Elias Mamo
(74) *Attorney, Agent, or Firm*—Dan Shifrin

(57) ABSTRACT

Because cable length affects signal quality, amplifying signals differently to account for cable length ("tuning") becomes especially important when high speed signals are used. Cable length information may be stored in a non-volatile memory which may be integrated into a cable assembly or may be a discrete component between the cable and an interface. Rather than using a dedicated data line to the memory component a ground line may be connected to the memory component and multiplexed. During normal operation the selected line is grounded through a switching device. When a cable is detected, a management controller changes the state of the switching device to decouple the selected line from ground to allow the management controller access to the data stored in the memory component, including cable length information. The selected line is then re-coupled to ground and interface circuits may be tuned for the cable length.

15 Claims, 6 Drawing Sheets

| SIGNAL | PIN USAGE BASED ON NUMBER OF PHYSICAL LINKS SUPPORTED BY THE CABLE ASSEMBLY* | | | |
|---|---|---|---|---|
| | ONE | TWO | THREE | FOUR |
| Rx 0+ | A2 | A2 | A2 | A2 |
| Rx 0- | A3 | A3 | A3 | A3 |
| Rx 1+ | N/C | A5 | A5 | A5 |
| Rx 1- | N/C | A6 | A6 | A6 |
| Rx 2+ | N/C | N/C | A8 | A8 |
| Rx 2- | N/C | N/C | A9 | A9 |
| Rx 3+ | N/C | N/C | N/C | A11 |
| Rx 3- | N/C | N/C | N/C | A12 |
| Tx 0+ | B2 | B2 | B2 | B2 |
| Tx 0- | B3 | B3 | B3 | B3 |
| Tx 1+ | N/C | B5 | B5 | B5 |
| Tx 1- | N/C | B6 | B6 | B6 |
| Tx 2+ | N/C | N/C | B8 | B8 |
| Tx 2- | N/C | N/C | B9 | B9 |
| Tx 3+ | N/C | N/C | N/C | B11 |
| Tx 3- | N/C | N/C | N/C | B12 |
| SIGNAL GROUND | A1, A4, A7, A10, A13 B1, B4, B7, B10, B13 | | | |
| CHASIS GROUND | HOUSING | | | |
| *N/C = NOT CONNECTED | | | | |

MULTIPLEXING A GROUND SIGNAL ON A HIGH SPEED CABLE INTERFACE TO PROVIDE ACCESS TO CABLE VITAL PRODUCT DATA

TECHNICAL FIELD

The present invention relates generally to high speed serial cable interfaces and, in particular to tuning circuitry according to the length of a cable connected to such an interface.

BACKGROUND ART

Fibre-channel, arbitrated-loop (FC-AL) storage systems generally require external FC cabling to interconnect multiple storage enclosures together. Such cabling requires different cable lengths depending on how close or far the enclosures are located with respect to each other. As serial interfaces operate at higher and higher speeds (e.g. 3 Gb/s, 6 Gb/s 10 Gb/s), it is important that high speed signal tuning be performed when such high speed signals are routed through cables in order to improve signal transmission. Given the practical requirement for different cable lengths, it becomes important to selectively tune the high speed signal characteristics as a function of the cable length. Thus, it is common practice to amplify signals that traverse long cables and less-amplify signals that traverse shorter cables. In order to determine the signal amplification (e.g. pre-emphasis or de-emphasis), the cable length must be known.

In FC-AL cabled storage systems a device called a small form factor pluggable (SFP) device is used, either as a discrete component between the cable and the FC-AL device or integrated within the cable assembly. FIGS. 1A and 1B illustrate versions of discrete SFP transceivers. Both integrated and discrete SFP transceivers contain a non-volatile memory component, such as a serial EEPROM, in which cable length information can be stored as cable vital product information (VPD). To access cable VPD information, several sideband signals were defined and implemented (I2C interface) by the SFP standards committee (see FIG. 2). The Mode Def bus incorporates an I2C interface; other pins are used to provide voltage to the SFP circuit board and its associated components.

Similar issues occur with serial attached SCSI (SAS) storage systems, However, the SAS external cable definitions do not provide any sideband signals for mini-SAS connectors (illustrated in FIGS. 3A, 3B and 4A, 4B) which may be used in future storage products. Indeed, only the high speed differential pairs (transmit and receive) and grounds have been defined; FIG. 5 illustrates the pin out list. As such, there is no current method to access VPD information, such as the cable length, if it were to be implemented within the cable assembly. Consequently, it remains desirable to provide cable length information for SAS external cable assemblies and to provide an interface mechanism that allows access to that information, while maintaining the SAS cable interface definition.

SUMMARY OF THE INVENTION

According to the present invention, the presence of a cable connected to a logic card is detected. The cable includes a non-volatile memory storing cable VPD. Rather than connecting the memory to the logic card with a dedicated line, a selected ground line is used. The selected line is disconnected from ground when the presence of a cable is detected and the cable VPD is read over the selected line to the logic card. The selected line is reconnected to ground and the connected cable is tuned in response to the cable VPD. A switching device, such as a transistor device, may be used to disconnect/reconnect the selected line from/to ground. A management controller may be used to detect the presence of a cable and to activate/deactivate the switching device. It may also be used to read the cable VPD information.

BRIEF DESCRIPTION OF THE DRAWINGS

FIG. 5 illustrates the pin-out list of a mini-SAS connector;

DETAILED DESCRIPTION OF THE PREFERRED EMBODIMENT

Figure 1A:
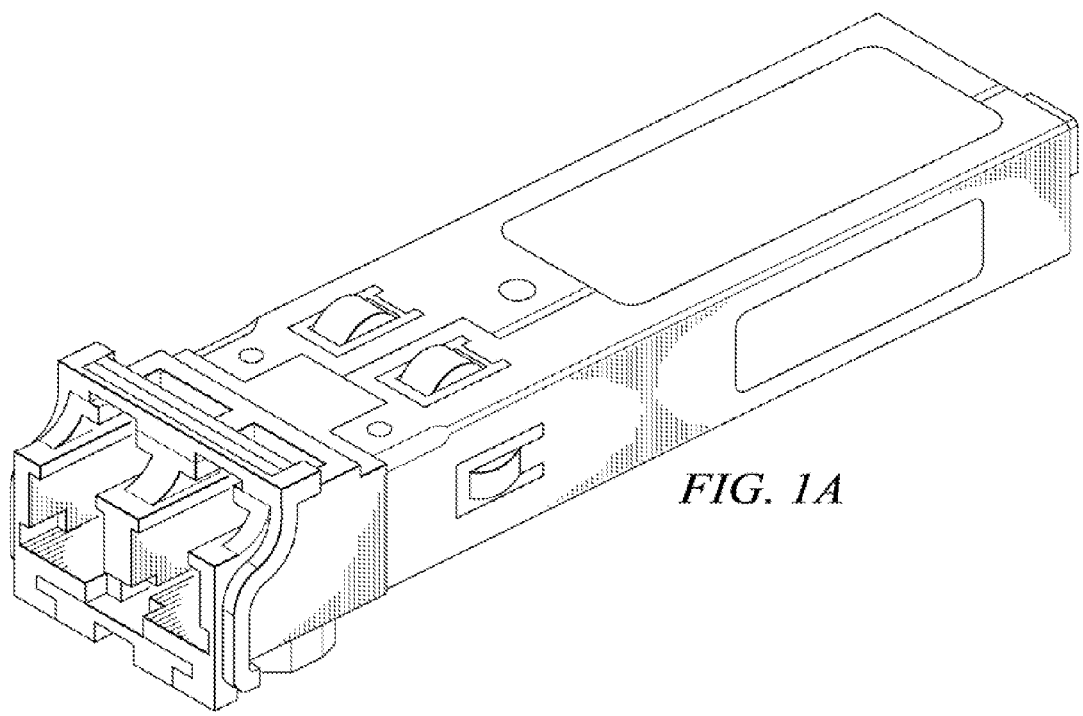
FIGS. 1A and 1B illustrate versions of discrete SFP transceivers.
Figure 1B:
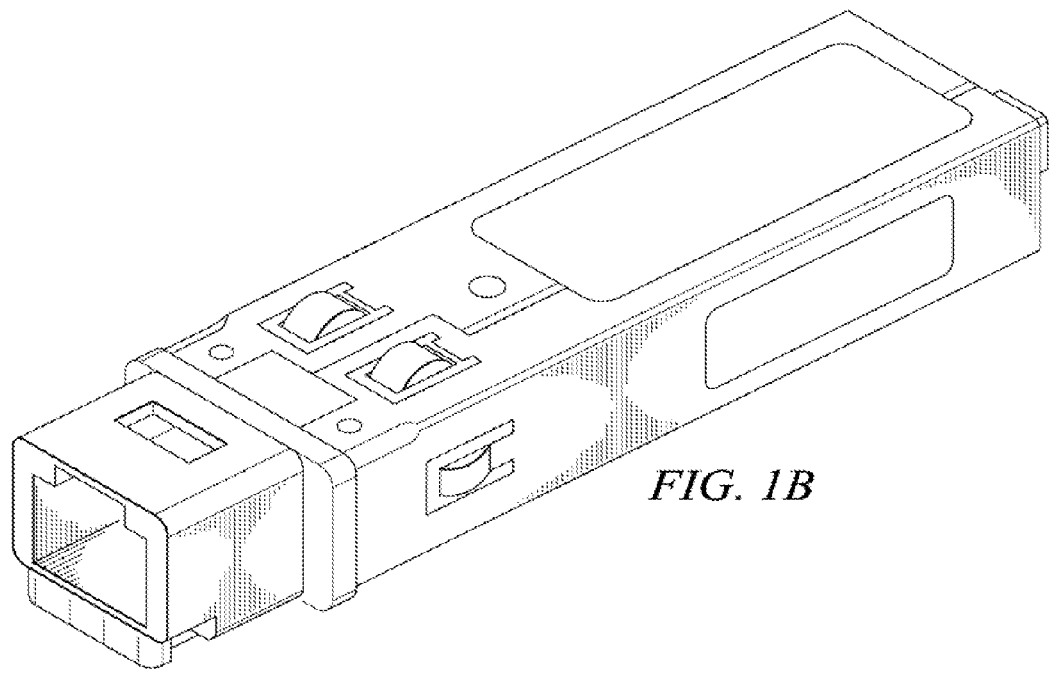
Figure 2:
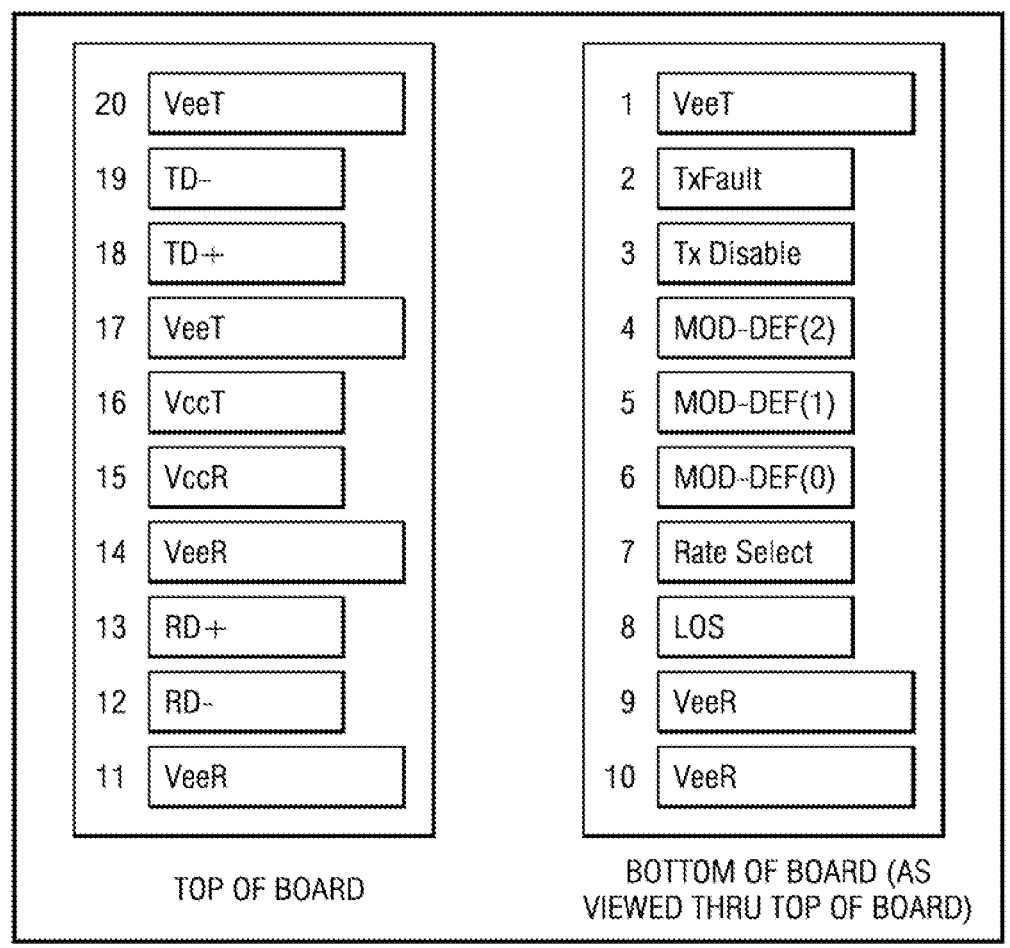
FIG. 2 illustrates the SFP transceiver pad layout.
Figure 3A:
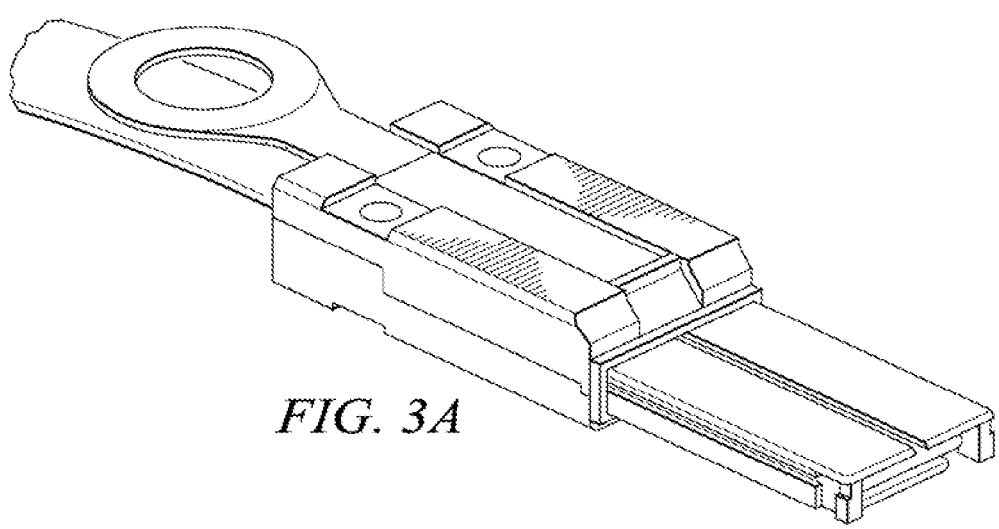
FIGS. 3A and 3B illustrate a mini-SAS cable plug connector with which the present invention may be implemented.
Figure 3B:
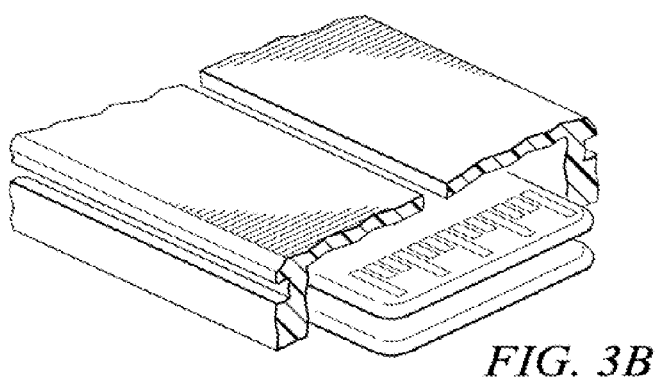
Figure 4A:
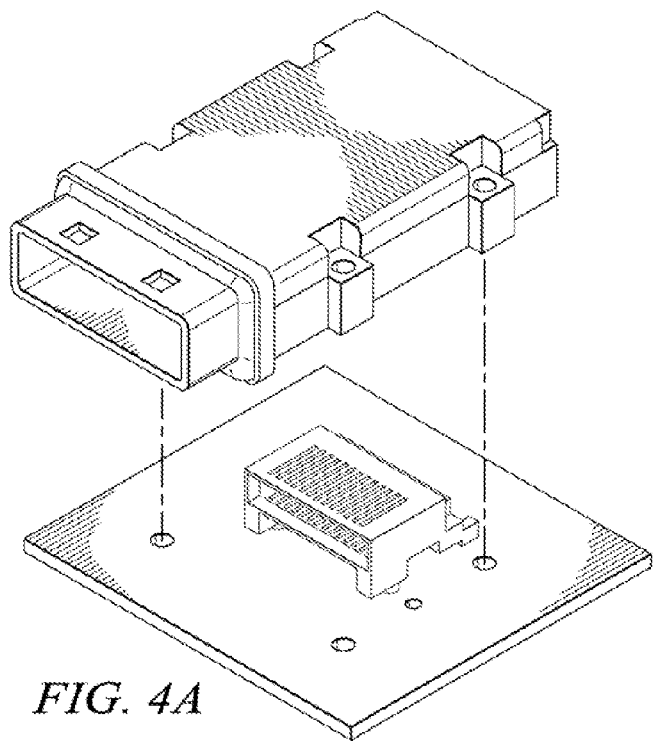
FIGS. 4A and 4B illustrate a mini-SAS receptacle connector with which the present invention may be implemented.
Figure 4B:
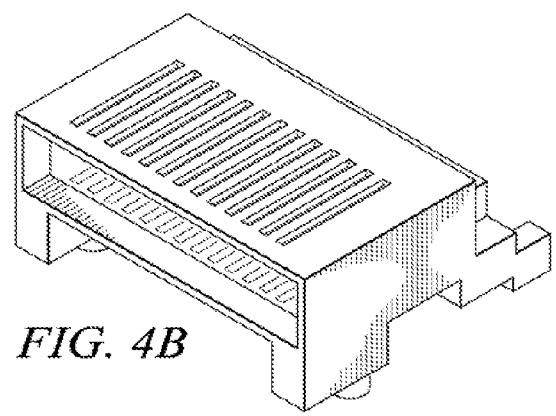
Figure 6:
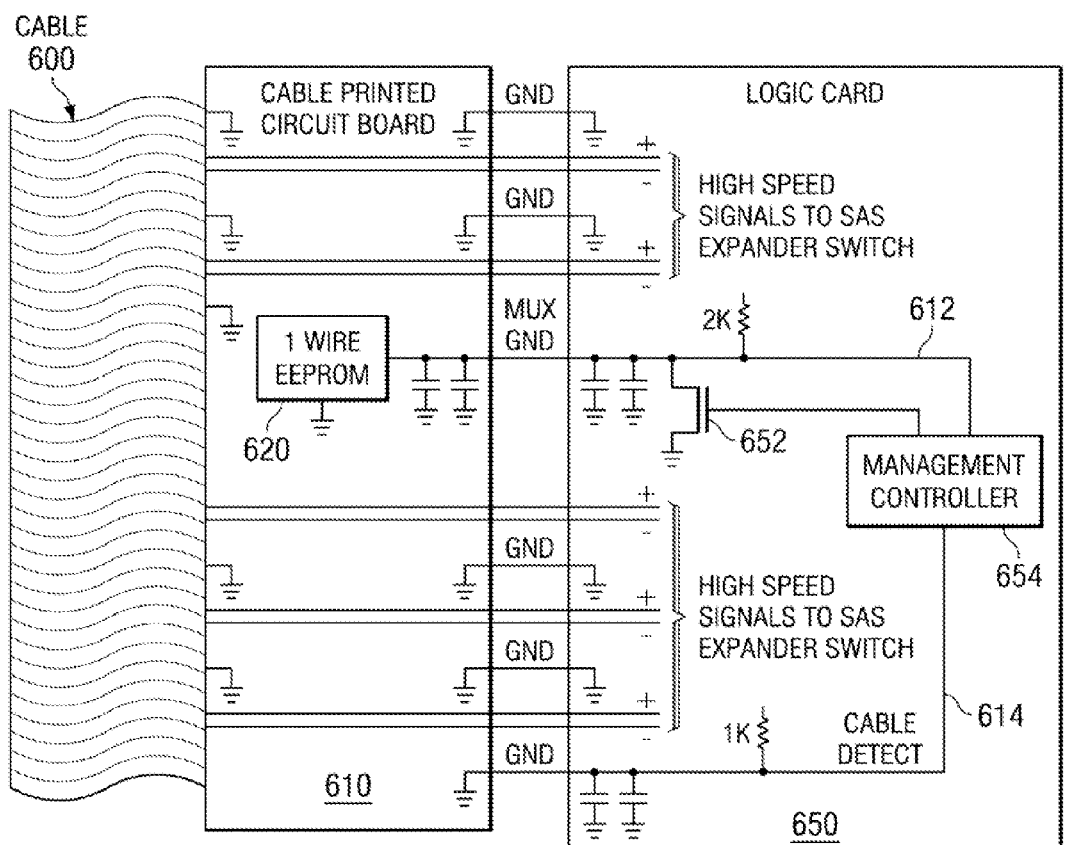
FIG. 6 schematically illustrates a ground multiplexing system of the present invention.

FIG. 6 schematically illustrates a ground multiplexing system of the present invention for accessing cable vital product data (VPD). Cable VPD may include cable length and cable wire gauge size, among other information. A cable 600 interconnects an SAS logic card 650 with an SAS device, such as a storage device (not shown). The present invention may also be used with other types of storage devices and logic cards, such as serial ATA (SATA). For purposes of illustration and not limitation, however, the invention will be described using SAS storage devices and logic cards. At the logic card end of the cable 600 is a printed circuit board (PCB) 610, either embedded in the cable 600 or as a discrete device. As indicated in the pin-out list of FIG. 5, there are 26 lines in the cable 600 and which pass through the PCB 610; for clarity, only several representative lines are shown in FIG. 6, including two ground lines 612 and 614. The PCB 610 includes a non-volatile memory 620, such as a one-wire EEPROM (in which both operating voltage and data access are provided by a single line), which contains cable VPD, including the cable length. The memory 620 is connected to the logic card 650 through the line 612 (referred hereinafter as the memory line 612). The logic card 650 includes a switching device 652, such as a FET or other transistor device, controlled by a management controller 654. When a FET is used as the switching device 652, the source terminal is coupled to ground, the drain terminal is coupled to the memory line 612, and the gate terminal is coupled to the management controller 654. It will be appreciated that other configurations may be employed.

In normal operation, the management controller 654 causes the switching device 652 to be in a first state whereby the memory line 612 is coupled to ground. When a FET is used as the switching device 652, the management controller 654 activates the FET through the gate, causing a current to flow between the drain and source, effectively grounding the memory line 612. When the storage system is powered on, the management controller 654 interrogates all cable interfaces, such as the one illustrated in FIG. 6, to determine if a cable is installed. If a cable is installed when the system is already powered up, the management controller similarly detects the new cable. The second ground line 614 (hereinafter referred to as the detect line 614) may be used for cable detection purposes. When a cable is detected, the management controller 654 causes the switching device 652 to change to a second state whereby the memory line 612 is decoupled from ground. When a FET is used as the switching device 652, the management controller 654 deactivates the FET. The management controller 654 may then access (read from/write to) the non-volatile memory 620. The cable VPD, including cable length information and/or cable wire gauge size, among other information, may be read and used by the management controller 654 to tune the cable interface circuitry. For example, for a long cable or smaller wire size, signals may be amplified; for a shorter cable or larger wire size, signals may be less amplified. After the cable VPD has been retrieved, the management controller 654 may then restore the switching device 652 to its first state (re-activate the FET) to couple the memory line 612 to ground. Thus, by multiplexing a ground line, the management controller 654 may access the non-volatile memory 620 when necessary and maintain normal data transfers at other times while staying within the standard cable interface definition.

Figure 7:
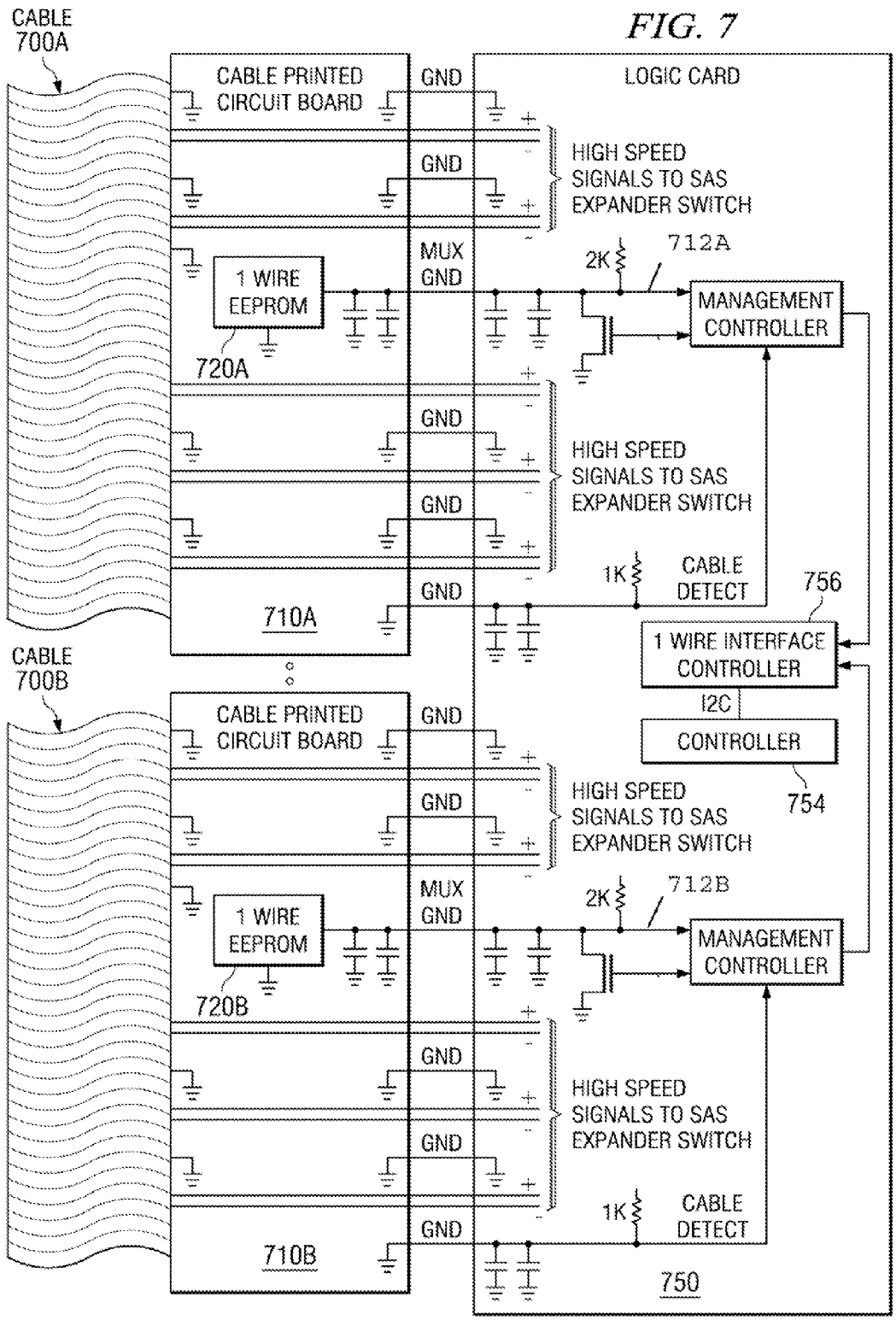
FIG. 7 illustrates another embodiment of the present invention in which multiple cables are connected to a single logic card.

FIG. 7 illustrates another embodiment of the present invention in which multiple cables, represented by two cables 700A, 700B in the Fig., are connected to a single logic card 750. Each cable 700A, 700B includes a non-volatile memory 720A, 720B: respectively, such as a one-wire EEPROM, containing cable VPD. The management controller 754 may interface with each of the cables 700A, 700B through interfaces such as I²C to one-wire interfaces 756A, 756B, each of which may incorporate a switching device to couple and decouple the memory line 712A, 712B from each non-volatile memory 720A, 720B. Alternatively, the switching devices may be a FET or other transistor device external to the I²C to 1-wire interface controllers 756A, 756B. The one-wire interfaces 756A, 756B may be separate devices or may integrated into a single one-wire interface controller (not shown). The management controller 754 may be used to detect when a cable is installed as part of the routine SAS discovery process. The port status of a newly attached cable may then be used to interrupt the management controller 754 which will interrogate the newly attached port to determine if it supports the cable VPD function. If so, the cable VPD may be read from the non-volatile memories 720A, 720B and cable interface circuitry adjusted in the manner described with respect to the embodiment of FIG. 6. When multiple SAS cables are implemented each cable is independently monitored in accordance with the above described discovery process. If a cable is a wide port cable (i.e. >1×) then if any PHY within the port is discovered to be active, it is assumed that all PHYs within that port should be treated the same.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of storage media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for accessing cable vital product data.

What is claimed is:

1. A method for accessing cable vital product data (VPD), comprising:
   detecting the presence of a cable connected through interface circuitry to a logic card to couple the logic card to an external device, the cable including a non-volatile memory storing cable VPD and having a selected line from the non-volatile memory to the logic card which is coupled to ground during normal operation of the external device;
   disconnecting the selected line from ground in response to detection of the cable;
   reading the cable VPD over the selected line from the non-volatile memory;
   reconnecting the selected line to ground; and
   tuning the interface circuitry in response to the cable VPD;
   Wherein reading the cable VPD comprises reading at least one of a length of the connected cable and a wire size of the connected cable; and wherein tuning the interface circuitry comprises adjusting amplification of signals being transmitted on the connected cable.

2. The method of claim 1, wherein disconnecting the selected line from ground comprises changing a state of a switching device from a first state, whereby the selected line is effectively coupled to ground, to a second state, whereby the selected line is decoupled from ground.

3. The method of claim 2, wherein changing the state of the switching device comprises deactivating a transistor device.

4. A logic card to which a cable is connectable, the logic card comprising:
   interface circuitry;
   a selected line to a non-volatile memory of a cable connectable to the interface circuitry to couple the logic card to an external device, the non-volatile memory storing cable vital product data (VPD);
   a switch having a first terminal coupled to the selected line, a second terminal coupled to a ground, and a control terminal; and
   a management controller having an output coupled to the control terminal of the switch and operable to:
      cause the switch to be in a first state in which the selected line is effectively coupled to the ground during normal operation of the external device;
      cause the switch to be in a second state when the management controller detects that the cable is connected to the interface whereby the selected line is decoupled from the ground and the cable VPD is accessible to the controller;
      adjust the interface circuitry in response to the cable VPD; and
      cause the switch to return to the first state after the management controller has accessed the cable VPD whereby the selected line is effectively coupled to the ground.

5. The logic card of claim 4, wherein the cable VPD includes cable length.

6. The logic card of claim 4, wherein the management controller is further operable to the interface circuitry by adjusting amplification of signals being transmitted on the connected cable.

7. The logic card of claim 4, wherein the switch comprises a transistor device.

8. The logic card of claim 7, wherein the first state of the transistor device comprises a deactivated state and the second state of the transistor device comprises an activated state.

9. The logic card of claim 4, further comprising a one-wire interface interposed between the management controller and the selected line.

10. The logic card of claim 4, further comprising:
a selected line to the non-volatile memory of each of a plurality of connectable cables, each cable having a non-volatile memory storing cable VPD; and
a plurality of one-wire interfaces, each interposed between the management controller and the selected line of one of the plurality of connectable cables.

11. The logic card of claim 4, further comprising a serial attached SCSI (SAS) interface and the connected cable interconnects the logic card with an SAS storage device.

12. The logic card of claim 4, further comprising a serial ATA (SATA) interface and the connected cable interconnects the logic card with a SATA storage device.

13. A computer program product of a computer readable storage medium usable with a programmable computer, the computer program product having computer-readable code embodied therein for accessing cable vital product data (VPD), the computer-readable code comprising instructions for:
detecting the presence of a cable connected through interface circuitry to a logic card and coupling the logic card to an external device, the cable including a non-volatile memory storing cable VPD and having a selected line from the non-volatile memory to the logic card which is coupled to ground during normal operation of the external device;
disconnecting the selected line from ground in response to detection of the cable;
reading the cable VPD over the line from the non-volatile memory; reconnecting the selected line to ground; and
tuning the interface circuitry in response to the cable VPD wherein the instructions for reading the cable VPD comprise instructions for reading a length of the connected cable and instructions for tuning the interface circuitry comprise instructions for adjusting amplification of signals being transmitted on the connected cable.

14. The computer program product of claim 13, wherein disconnecting the selected line from ground comprises changing a state of a switching device from a first state, whereby the selected line is effectively coupled to ground, to a second state, whereby the selected line is decoupled from ground.

15. The computer program product of claim 14, wherein the instructions for changing the state of the switching device comprise instructions for deactivating a transistor device.

* * * * *